United States Patent
Masters et al.

(10) Patent No.: US 9,464,735 B2
(45) Date of Patent: Oct. 11, 2016

(54) SYSTEMS AND METHODS FOR SUPPORTING TUBULAR MEMBERS

(71) Applicant: AIMS International, Inc., Houston, TX (US)

(72) Inventors: Blake R. Masters, Houston, TX (US); Rodney H. Masters, Houston, TX (US); Billy L. Griffith, Spring, TX (US)

(73) Assignee: ASSET INTEGRITY MANAGEMENT SOLUTIONS, L.L.C., Houston, TX (US)

( * ) Notice: Subject to any disclaimer, the term of this patent is extended or adjusted under 35 U.S.C. 154(b) by 0 days.

(21) Appl. No.: 14/974,676

(22) Filed: Dec. 18, 2015

(65) Prior Publication Data

US 2016/0102784 A1    Apr. 14, 2016

Related U.S. Application Data

(63) Continuation-in-part of application No. 12/868,541, filed on Aug. 25, 2010, now Pat. No. 9,217,519.

(60) Provisional application No. 61/236,825, filed on Aug. 25, 2009.

(51) Int. Cl.
*F16L 3/22* (2006.01)
*F16L 3/223* (2006.01)
*F16L 3/12* (2006.01)

(52) U.S. Cl.
CPC ............ *F16L 3/2235* (2013.01); *F16L 3/1222* (2013.01); *F16L 3/22* (2013.01)

(58) Field of Classification Search
USPC ............. 248/49, 56, 65, 68.1; 211/60.1, 194
See application file for complete search history.

(56) References Cited

U.S. PATENT DOCUMENTS

| | | |
|---|---|---|
| 501,439 A | 7/1893 | Reznor |
| 861,887 A | 7/1907 | Peirce |
| 1,193,480 A | 8/1916 | O'Day |
| 1,642,005 A | 2/1925 | Arnstein |
| 1,750,798 A | 3/1930 | Monroe |
| 1,772,902 A | 8/1930 | Knowlton |
| 1,801,451 A | 4/1931 | Parker |
| 1,822,475 A | 9/1931 | Burke |
| 2,218,316 A | 10/1940 | Moon |
| 2,269,286 A | 1/1942 | Ekern |
| 2,291,148 A | 7/1942 | Carson |

(Continued)

FOREIGN PATENT DOCUMENTS

| | | |
|---|---|---|
| DE | 3218007 | 11/1983 |
| GB | 2444602 | 6/2008 |

(Continued)

OTHER PUBLICATIONS

International Search Report and Written Opinion issued in Application PCT/US09/66629, dated Feb. 1, 2010, 10 pages.

(Continued)

*Primary Examiner* — Steven Marsh
(74) *Attorney, Agent, or Firm* — Edmonds & Nolte, P.C.

(57) ABSTRACT

Apparatus, systems, and methods for supporting tubular members are provided. A support structure can include at least one body having a plurality of openings disposed therethrough. Each opening can have an inner surface that includes at least one circular portion and at least one elliptical portion.

20 Claims, 4 Drawing Sheets

(56) References Cited

U.S. PATENT DOCUMENTS

| | | |
|---|---|---|
| 2,300,059 A | 10/1942 | Perry |
| 2,319,832 A | 5/1943 | Trochim |
| 2,339,564 A | 1/1944 | Goldberg |
| 2,339,565 A | 1/1944 | Goldberg |
| 2,404,531 A | 7/1946 | Robertson |
| 2,423,455 A | 7/1947 | Larson |
| 2,549,239 A | 6/1948 | Robertson |
| 2,579,240 A | 12/1951 | Masoner |
| 2,746,703 A | 5/1956 | Emery |
| 2,749,852 A | 6/1956 | Bulluck |
| 2,849,027 A | 8/1958 | Tetyak |
| 2,913,125 A | 11/1959 | Burtenshaw |
| 3,098,567 A | 7/1963 | Steel |
| 3,165,205 A | 1/1965 | Travis, Jr. |
| 3,175,693 A | 3/1965 | Steel |
| 3,204,901 A | 9/1965 | Dunu |
| 3,224,385 A | 12/1965 | Elsner |
| 3,266,761 A | 8/1966 | Walton |
| 3,437,297 A | 4/1969 | Jirka |
| 3,458,215 A | 7/1969 | Maradyn |
| 3,731,448 A | 5/1973 | Leo |
| 3,965,938 A | 6/1976 | Bauerle |
| 3,993,344 A | 11/1976 | Bennett |
| 4,033,465 A | 7/1977 | Stine |
| 4,061,391 A | 12/1977 | Violette |
| 4,080,998 A | 3/1978 | Mottola |
| 4,093,076 A | 6/1978 | Newton |
| 4,095,698 A | 6/1978 | Wright |
| 4,099,617 A | 7/1978 | Nist |
| 4,099,626 A | 7/1978 | Magnussen, Jr. |
| 4,175,666 A | 11/1979 | Smith |
| 4,202,520 A | 5/1980 | Loos |
| 4,247,009 A | 1/1981 | Vaurigaud |
| 4,266,745 A | 5/1981 | Jones |
| 4,270,662 A | 6/1981 | Gonzalez |
| 4,293,155 A | 10/1981 | Grant |
| 4,306,697 A | 12/1981 | Mathews |
| 4,358,232 A | 11/1982 | Griffith |
| 4,378,923 A | 4/1983 | Takei |
| 4,422,555 A | 12/1983 | Jacobs |
| 4,465,400 A | 8/1984 | Adams |
| 4,529,345 A | 7/1985 | Van Gompel |
| 4,618,114 A | 10/1986 | McFarland |
| 4,846,610 A | 7/1989 | Schoenleben |
| 4,889,298 A | 12/1989 | Hauff |
| 4,941,630 A | 7/1990 | Albano |
| 5,005,789 A | 4/1991 | Jones |
| 5,027,960 A | 7/1991 | Rainville |
| 5,123,547 A | 6/1992 | Koch |
| 5,154,556 A | 10/1992 | Wappel |
| 5,181,561 A | 1/1993 | Ayers |
| D338,827 S | 8/1993 | Rumble |
| 5,458,155 A | 10/1995 | Stephens |
| 5,513,761 A | 5/1996 | Kobayashi |
| 5,645,369 A | 7/1997 | Geiger |
| 5,649,632 A | 7/1997 | Terashima |
| 5,735,412 A | 4/1998 | Sheckells |
| 5,773,508 A | 6/1998 | Tendo |
| 5,971,329 A * | 10/1999 | Hickey ............... F16L 3/227 248/316.7 |
| 5,992,802 A | 11/1999 | Campbell |
| 6,030,158 A | 2/2000 | Tatina |
| 6,032,907 A | 3/2000 | Santa Cruz |
| 6,135,397 A | 10/2000 | Santa Cruz |
| 6,202,962 B1 | 3/2001 | Snyder |
| 6,224,024 B1 | 5/2001 | Fritz |
| 6,352,367 B1 | 3/2002 | Konomoto |
| 6,408,492 B1 | 6/2002 | Sparks |
| 6,450,459 B2 | 9/2002 | Nakanishi |
| 6,474,613 B2 | 11/2002 | O'Malley |
| 6,557,805 B1 | 5/2003 | Snyder |
| 6,648,281 B1 | 11/2003 | Lake |
| 6,902,138 B2 | 6/2005 | Vantouroux |
| 6,997,330 B2 | 2/2006 | Pachao-Morbitzer |
| 7,083,151 B2 | 8/2006 | Rapp |
| 7,131,803 B2 | 11/2006 | Guarisco, Sr. |
| 7,186,066 B2 | 3/2007 | Bohac |
| 7,306,414 B2 | 12/2007 | Bohac |
| 7,628,285 B2 | 12/2009 | Salvia |
| 8,133,049 B1 | 3/2012 | Sullivan |
| 8,235,331 B2 | 8/2012 | McIntosh |
| 2003/0164347 A1 | 9/2003 | Bouvier |
| 2004/0056156 A1 | 3/2004 | Dodson |
| 2004/0057808 A1 | 3/2004 | Segura |
| 2005/0173597 A1 | 8/2005 | Farrell |
| 2005/0247828 A1 | 11/2005 | Tzur |
| 2005/0279893 A1 | 12/2005 | Rapp |
| 2006/0289471 A1 | 12/2006 | Sasaki |
| 2007/0170334 A1 | 7/2007 | Ambrose |

FOREIGN PATENT DOCUMENTS

| | | |
|---|---|---|
| JP | 56-996 U | 1/1981 |
| JP | 11094136 | 9/1997 |
| JP | 2001108150 | 4/2001 |

OTHER PUBLICATIONS

International Preliminary Report on Patentability Issued in Application No. PCT/US09/066629, dated Jun. 16, 2011 (10 pages).

* cited by examiner

SYSTEMS AND METHODS FOR SUPPORTING TUBULAR MEMBERS

CROSS REFERENCE TO RELATED APPLICATION

This application is a continuation of co-pending U.S. patent application Ser. No. 12/868,541, filed on Aug. 25, 2010, which claims the benefit of U.S. Provisional Patent Application No. 61/236,825, filed on Aug. 25, 2009, which are both incorporated by reference herein.

BACKGROUND OF THE INVENTION

1. Field of the Invention

Embodiments of the present invention generally relate to systems and methods for supporting a tubular member. More particularly, embodiments relate to systems and methods for supporting a plurality of tubular members.

2. Description of the Related Art

Natural gas is predominantly transported in gaseous form via pipeline from a point of production to a point of distribution. It is typically not feasible, however, to transport stranded or remote natural gas deposits via pipeline because such deposits are rarely located near a pipeline. Other modes of transfer are therefore needed to make the use of stranded or remote natural gas deposits more economical.

One proposed mode of transportation is an ocean going vessel adapted to contain and store the natural gas in its liquid phase. Natural gas can be liquefied at low temperatures, which is commonly known as liquefied natural gas ("LNG"), or at high pressures, which is commonly known as compressed natural gas ("CNG"). Because LNG and CNG require extreme temperature and/or pressure conditions, extreme care must be exercised when handling natural gas in its liquid phase.

There is a need, therefore, for new systems and methods for transporting natural gas in liquid form.

SUMMARY

Apparatus, systems, and methods for supporting tubular members are provided. In at least one specific embodiment, the support structure can include at least one body having a plurality of openings disposed therethrough. Each opening can have an inner surface that includes at least one circular portion and at least one elliptical portion.

In one or more embodiments, the system for supporting tubular members can include two or more support structures. Each support structure can include at least one body having a plurality of openings disposed therethrough. Each opening can have an inner surface that includes at least one circular portion and at least one elliptical portion.

DETAILED DESCRIPTION

Figure 1:
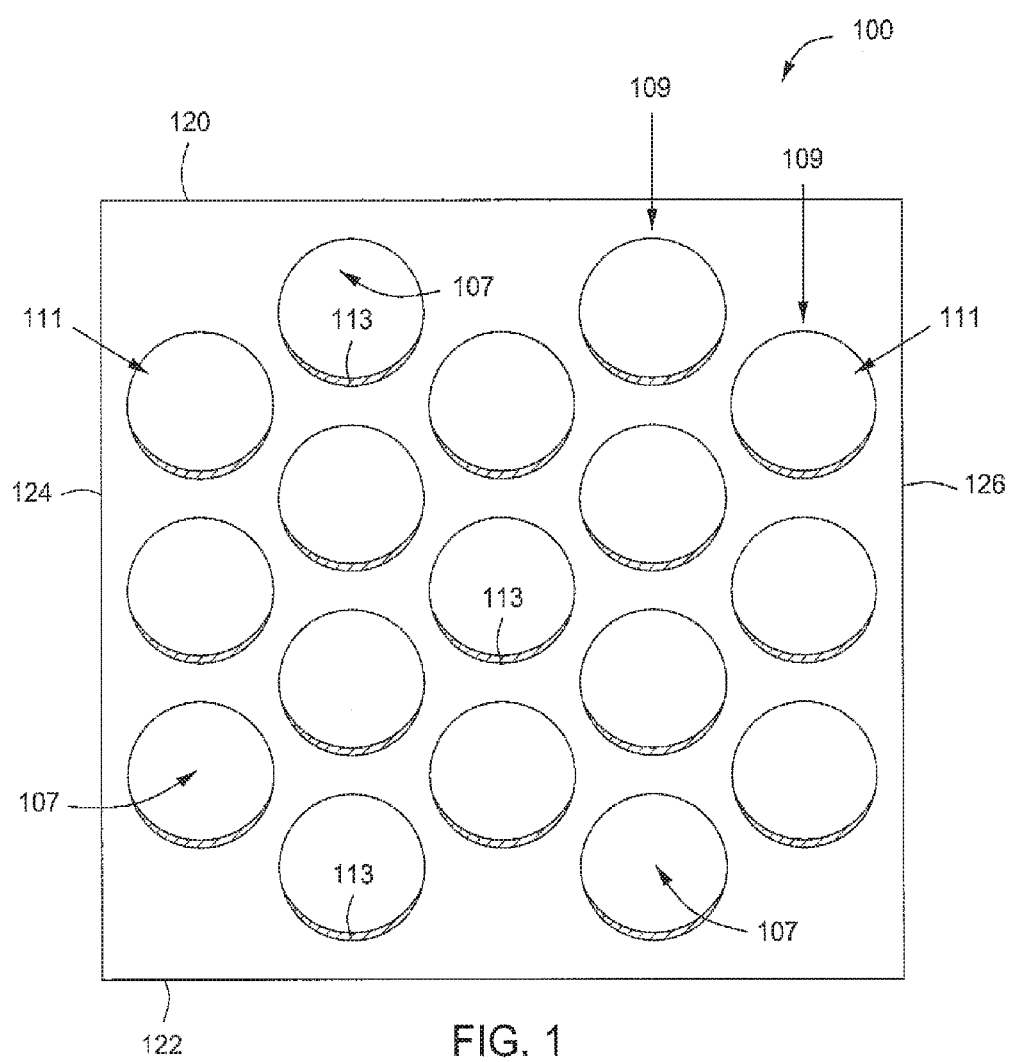
FIG. 1 depicts an elevational view of an illustrative support structure for supporting one or more tubular members, according to one or more embodiments described.

FIG. 1 depicts an elevational view of an illustrative support structure 100 for supporting one or more tubular members (not shown), according to one or more embodiments. The support structure or support wall 100 can include a plurality of apertures or openings 107 arranged thereabout. The openings 107 can be disposed about the support structure 100 in any order, frequency, pattern, or configuration. The openings 107 can also be arranged about the support structure in vertically aligned rows, horizontally aligned rows, and/or diagonally aligned rows. For example, the support structure 100 can have at least one row of vertically aligned openings (four rows 109 are shown). Each row 109 can be vertically offset or shifted with respect to one another to provide diagonally aligned rows 111. This particular arrangement of openings 107 can provide more openings 107 through the support structure 100 as compared to openings 107 that are both vertically and horizontally aligned.

The openings 107 can be formed in the support structure 100 using any suitable methods and devices. For example, the openings 107 can be drilled or cut or formed during or after fabrication of the support structure 100. Cutting the openings 107 can be performed using any type of saw or other cutting device. For example, the openings 107 can be cut using a jig saw, reciprocating saw, chain saw, knife blade, water jet, laser, torch, or the like.

The support structure 100 can be formed using any molding technique including, but not limited to, pultrusion, vacuum assisted resin transfer molding ("VARTM"), vacuum infusion molding, random glass cast and/or compression molding, or any combination thereof. The support structure 100 can also be made of any suitable material including one or more metals, metal alloys, non-metallic materials, or combinations thereof. Suitable metals and metal alloys can include, but are not limited to steel, carbon steel, steel alloys, stainless steel, stainless steel alloys, aluminum, aluminum alloys, nickel, nickel based alloys, bronze, brass, non-ferrous metals, non-ferrous metal alloys, or combinations thereof. Suitable non-metallic materials can include, but are not limited to, carbon fiber, epoxies, concrete, masonry bricks, fiberglass, thermoplastics including one or more polyolefins such as polypropylene and polyethylene, rubber, elastomers including ethylene propylene diene monomer ("EPDM"), polyurethane, blends thereof, derivatives, thereof, or other polymeric materials.

The support structure 100 can also be at least partially coated with a different or second material, preferably one or more non-metallic materials. For example, a support structure 100 made from one or more metals or metal alloys can be at least partially coated with the one or more non-metallic materials noted herein. The non-metallic material can be at least partially disposed about a "front" side, a "rear" side, and/or along the edges of the support structure 100 and/or along the edges of the openings 107. As used herein, the terms "lower" and "upper," "left" and "right," "top" and "bottom," "front" and "rear," and other like directional terms are merely used for convenience to indicate spatial orientations or spatial relationships relative to one another in respect to the support 100.

The support structure 100 can have any suitable thickness. The support structure 100 can have a thickness, measured from the front side to the rear side, ranging from a low of about 0.25 cm, about 5 cm, about 10 cm, or about 20 cm to a high of about 50 cm, about 60 cm, about 100 cm, about 200 cm, or more than about 200 cm. In at least one specific example, the support structure 100 can have a thickness of about 2 cm, about 2.5 cm, about 3.5 cm, or about 4 cm. In one or more embodiments, the thickness of the support structure 100 can be constant or can vary from the upper end 120 to the lower end 122 thereof. For example, the support structure 100 can taper from the second end 122 to the first end 120 to provide a support structure 100 having a thicker second end 122 than the first end 120.

The support structure 100 can have any desired dimensions. For example, the support structure 100 can have a dimension, such as a length, measured from a top end 120 to a bottom end 122 thereof ranging from a low of about 0.5 m, about 1 m, about 2 m, about 3 m, about 4 m, or about 5 m to a high of about 6 m, about 10 m, about 13 m, about 15 m, or about 20 m, or more than about 20 m. The support structure 100 can have another dimension, such as a width, measured from a left side 124 to a right side 126 thereof ranging from a low of about 0.5 m, about 1 m, about 2 m, about 3 m, about 4 m, or about 5 m to a high of about 10 m, about 20 m, about 30 m, about 40 m, or more than about 40 m.

As shown, the support structure 100 can be rectangular in shape; however, the support structure 100 can have any shape including circular, elliptical, triangular, squared, rectangular, or other polygonal or geometrical shape, and can conform to the dimensions of any surrounding frame or other structure (not shown). In other words, the sides of the support structure 100 can be linear, non-linear, or a combination of linear and non-linear curves. The support structure 100 can be also flat or substantially flat. The support structure 100 can be wavy or corrugated. The support structure 100 can also have one or more projections extending therefrom or recesses formed therein.

The support structure 100 can further include an insert 113. The insert 113 can be at least partially disposed within and/or about an inner surface of any one or more openings 107. The insert 113 can conform to the contour of the openings 107. The insert 113 can be disposed about the entire perimeter or inner surface of the opening 107 or, as shown, the insert 113 can be disposed about a portion of the opening 107. For example, the insert can be disposed about 2%, about 5%, about 10%, about 15%, about 20%, about 25%, about 30%, about 40%, about 50%, or more than about 50% of the opening 107. The insert 113 can provide a barrier or layer between the support structure 100 and one or more bodies (not shown) that can be at least partially disposed within the openings 107. The insert 113 can insulate or isolate one or more bodies that can be at least partially disposed within the openings 107. The insert 113 can reduce the potential for abrasion or wear to occur between the support structure 100 and one or more bodies at least partially disposed within the openings 107. The insert 113 can provide a desired surface for one or more that can be at least partially disposed within the openings 107 to contact or rest on or against. For example, the inert 113 can provide a surface having a reduced or an increased amount of friction between the insert 113 and one or more bodies that can be disposed thereon.

The insert 113 can be made from any suitable material, such as those mentioned herein. The insert 113 can also be integral with the support structure 100. For example, a support structure 100 made from reinforced polyurethane can have the insert 113 integrated with the support structure 100. In an embodiment, the insert 113 can be fully contained within a thickness of the opening 107. In another embodiment, the insert 113 can be at least partially contained within a thickness of the opening 107 and can at least partially extend out from the support structure 100.

The openings 107 and insert 113 can have any suitable shape and size. The edges or inner surfaces of the openings 107 can have any type of curve and/or combination of curves. Illustrative curves can include circular, elliptical, parabolic, catenary, simple, or any combination thereof. Different portions of the perimeter of the openings 107 can have different curves/curvatures or different configurations of curves. For example, about the upper portion of the openings 107, e.g. about the upper one third of the perimeter of the openings 107 can be elliptically curved and the lower two thirds of the perimeter of the openings 107 can be circular. As such, the perimeter of the openings 107 can include multiple types of curve surfaces to provide a desired shape for the openings 107. In at least one example, the inner surface of the openings 107 can have a circular portion about a first portion thereof and an elliptical portion about a second portion thereof. In at least one other example, the openings 107 can have a circular portion about a first portion thereof and an elliptical portion about a second portion thereof, where the circular portion opposes the elliptical portion. In one or more embodiments, an opening 107 having a curved portion and an elliptical portion, where the circular portion opposes the elliptical portion, the curved portion can contact and support a tubular member (not shown) disposed through the opening 107 and a gap or space can be present between the tubular member and at least a portion of the elliptical surface. In one or more embodiments, the openings 107 can have one or more of the configurations or shapes provided by a plurality of the support bodies discussed and described in International Publication No. WO 2010/065767 A1, which is incorporated by reference herein.

The support structure 100 can be a single, monolithic body or a body made of two more components that are combined or joined together. Forming the support structure 100 from a plurality of smaller sections or components allows the support structure 100 to be more easily constructed, transported, and/or positioned on a frame, a vessel, or the like. Each support structure 100 can include any number of openings 107. For example, the number of openings disposed through each support structure 100 can range from a low of about 1, about 10, or about 25 to a high of about 50, about 100, about 200, about 300, about 400, about 500, about 1,000, or more than about 1,000.

Figure 2:
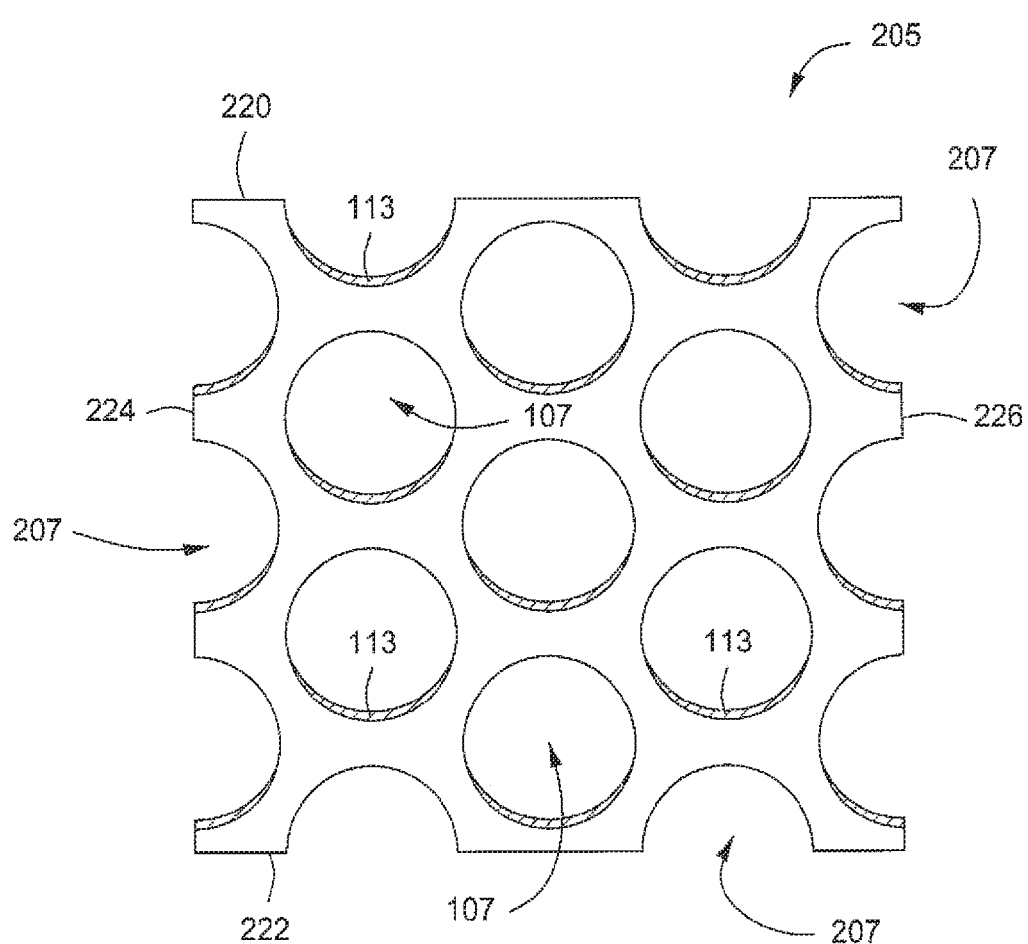
FIG. 2 depicts an elevational view of a section that can form a portion of the support structure depicted in FIG. 1, according to one or more embodiments described.

FIG. 2 depicts an elevational view of an illustrative section 205 that can form a portion of the support structure 100. Depending on the orientation or positioning of the openings 107 along the section 205, the section 205 can have an outer perimeter or edge having a portion or section 207 of openings 107 formed therein. A plurality of the sections 205 can be properly oriented and arranged with respect to one another and then connected to one another to provide the support structure 100.

Any number of sections 205 can be aligned and secured to one another to provide the support structure 100. For example, two sections 205 can be oriented with respect to one another such that a "right" side 226 of the first section 205 is aligned with a "left" side 224 of the second section 205. In another example, two sections 205 can be oriented with respect to one another such that a "top" side 220 of the first section 205 is aligned with a "bottom" side 222 of the second section 205. Multiple sections 205 can also be over-lapped to tailor the thickness of the support structure 100.

Suitable fastening systems or methods can include, but are not limited to, welding, bolts and nuts, rivets, pins, screws, adhesives, or the like. Although not shown, the sections 205 can include male and/or female connectors that can connect with a complementary male/female connector of an adjacent or overlapping section 205. Cross beams or cross plates can also be used to secure adjacent sections 205 together.

Figure 3:
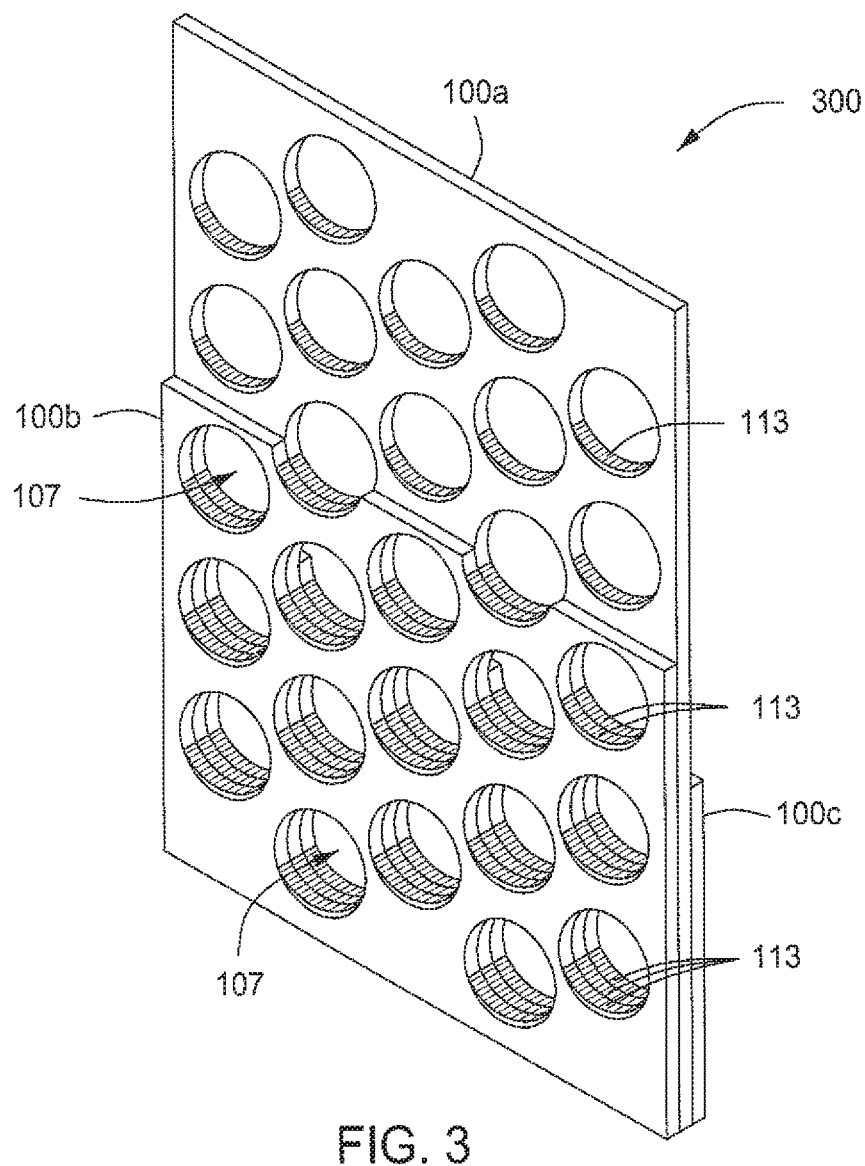
FIG. 3 depicts an isometric view of an illustrative stacking arrangement of multiple support structures, according to one or more embodiments described.

FIG. 3 depicts an isometric view of an illustrative stacking arrangement of multiple support structures 100, according to one or more embodiments. As shown, the support system 300 can include any number of support structures 100 arranged or stacked together (three are shown 100*a*, 100*b*, 100*c*). Each support structure 100*a*, 100*b*, 100*c* can have the same or different height, width, and/or thickness. Each support structure 100*a*, 100*b*, 100*c* can also have the same or different number of openings 107. Moreover, any or all of the support structure 100*a*, 100*b*, 100*c* can include the same or different number of sections 205, as described above with reference to FIG. 2.

Stacking multiple support structures 100 together can provide a stair step or other type of change in thickness of the support system 300. For example, if each support structure 100*a*, 100*b*, and 100*c* has the same thickness then the bottom of the support system 300 depicted in FIG. 3 will be three times as thick as the top of the support system 300. Likewise, the portion of the support system 300 where the first support structure 100*a* and the second support structure 100*b* overlap will have a thickness that is about two thirds as thick as the bottom portion where three structures 100*a*, 100*b*, 100*c* overlap, or about twice as thick as the top portion of the support system 300 where there is only the support structure 100*a*.

As mentioned previously, each support structure 100*a*, 100*b*, 100*c* can have the same thickness. Each support structure 100*a*, 100*b*, and 100*c* can also have a different thickness than another. The particular number, thickness, and height of the support structures 100 (e.g. 100*a*, 100*b*, and 100*c*) can be based, at least in part, on the weight the support system 300 is required to support and/or the forces that may be exerted on the support system 300 from the environment.

The support structures 100*a*, 100*b*, 100*c* can be secured to one another using any suitable fastener or fastening device. Illustrative fasteners can include, but are not limited to, bolts and nuts, rivets, cotter pins, male/female connecting devices, threaded rods, screws, and the like. In another example the support structures 100*a*, 100*b*, 100*c* can be secured to one another using an adhesive. In still another example the support structures 100*a*, 100*b*, 100*c* can be secured to one another by welding. In yet another example, the support structures 100*a*, 100*b*, 100*c* can be integrated with one another as a single, continuous support structure 100.

Figure 4:
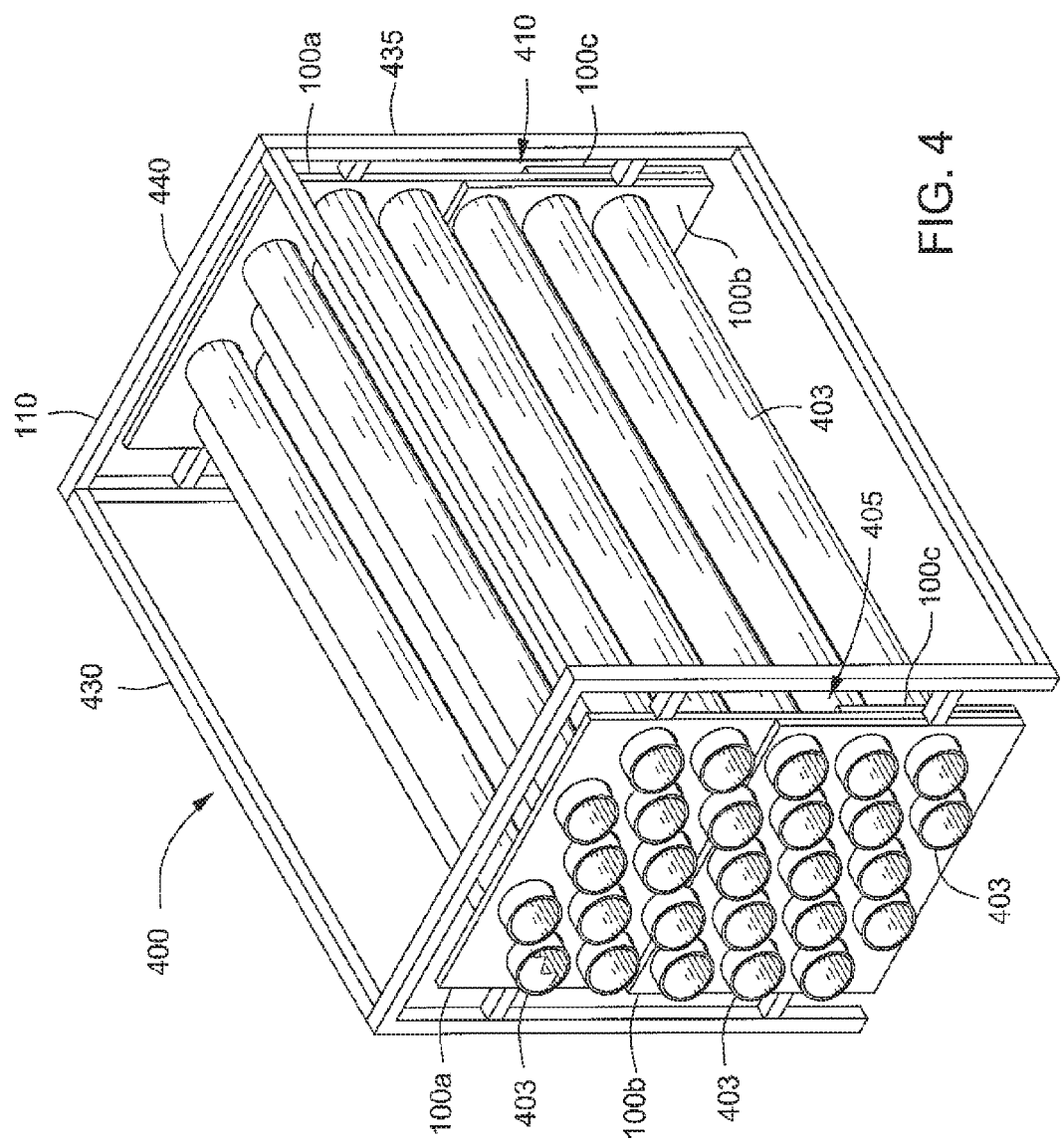
FIG. 4 depicts an isometric view of an illustrative support system for supporting one or more tubular members, according to one or more embodiments described.

FIG. 4 depicts an isometric view of an illustrative support system 400 for supporting one or more tubular members 403, according to one or more embodiments. As shown, the support system 400 can include two or more support assemblies 405, 410 that each include one or more support structures or support structures 100, as described above with reference to FIGS. 1 to 3. For example, the first support assembly 405 can include three support structures 100*a*, 100*b*, 100*c* that are stacked together, and the second support assembly 410 can also include three support structures 100*a*, 100*b*, 100*c*. As such, each support assembly 405, 410 has a variable thickness from a first ("lower") end thereof to a second ("upper") end thereof. In another example, the first support assembly 405 and/or the second support assembly 410 can each include one, two, three, four, five, six, seven, eight, nine, ten, or more than 10 support structures 100 discussed and described above with reference to FIGS. 1 to 3.

For support assemblies 405 and/or 410 having two or more support structures 100, the support structures 100 can be arranged in any desirable configuration with respect to one another. For example, the two or more support structures can be disposed adjacent one another. Adjacent configurations can include stacking next to one another as shown in FIG. 4, for example. In another example, the two or more support structures can at least partially overlap one another. Overlapping configurations can include support structures stacked next to one another and having differing lengths. In another example, the two or more support structures can be stacked one on top of the other. In another example, the two or more support structures can be arranged end to end or side to side, with respect to one another.

The support system 400 can include any number of support assemblies 405, 410 disposed about the tubular member(s) 403. The support assemblies 405, 410 can be equally spaced about the length of the tubular members 404. Any two or more support assemblies 405, 410 can disposed adjacent one another. The number and location of the support assemblies 405, 410 can be based at least in part on the length of the one or more tubular members 403. As used herein, the term "tubular member" refers to any elongated member or body. Illustrative tubular members can include, but are not limited to, pipes, pipelines, communication lines, conduits, electrical lines, open channels, ducts, poles, posts, rods, or the like.

Increasing the thickness of the support assemblies 405, 410 or, as illustrated, providing a plurality of support structures 100 that are stacked together can provide a support system 400 capable of supporting a greater load or weight. As the number of tubular members 403 supported by the support system 400 increases so does the weight that the support system 400 needs to support. For example, as the number of vertically aligned tubular members 403 increase, the load exerted on the lower end of the support sections 405, 410 also increases. By adding additional support structures 100 to each support section 405, 410, the support system 400 can be adapted to support any number of tubular members having any weight while the weight of the support system 400 is kept to a minimum. In other words, stacking a plurality of support structures 100 having differing heights can provide support assemblies 405, 410 that can support a desired number of tubular members 403, but at the same time does not require every support structure 100 to extend from the bottom to the top of each support assembly 405, 410.

Considering the tubular members 403 in more detail, the support system 400 can support any number of tubular members 403. For example, the support system 400 can support 10 or more, 20 or more, about 50 or more, about 100 or more, about 200 or more, about 300 or more, about 400 or more, or about 500 or more tubular members 403. Each tubular member 403 can have any length ranging from a low of about 0.3 m, about 1 m, about 1.5 m, about 3 m, 6 m, or about 12 m to a high of about 20 m, about 40 m, about 80 m, about 120 m, about 160 m, or about 200 m. Each tubular member 403 can also have any suitable outer diameter or cross-sectional length(s). For example, an outer diameter of the one or more tubular members 403 can range from a low of about 2 cm, about 4 cm, about 10 cm, about 20 cm, about 30 cm, about 40 cm, or about 50 cm to a high of about 120 cm, about 140 cm, about 160 cm, about 180 cm, or about 200 cm.

In one or more embodiments, two or more tubular members 403 can be sequentially connected together to form a pipeline (not shown). The tubular members 403 can be connected using 180° bends, 90° elbows, or the like to form a pipeline. In one or more embodiments, the individual tubular members 403 and/or pipeline formed therefrom can be used to store, carry, or convey any one or more fluids, including but not limited to LNG and/or CNG.

The one or more tubular members 403 can include one or more ferrous, non-ferrous, and/or polymeric materials. Preferably, the tubular members 403 are fabricated from one or more materials suitable for use in high pressure service, such as pressures of about 3.5 MPa or more, about 7 MPa, or more, about 14 MPa or more, about 20 MPa or more, or about 27 MPa or more. The one or more tubular members 403 are also preferably fabricated from one or more materials suitable for use in low and/or high temperature service, such as temperatures of about 300° C. or less, about 150° C. or less, about 400° or less, about 50° C. or less, about 0° C. or less, about −50° C. or less, about −75° C. or less, about −100° C. or less, about −130° C. or less, or about −150° C. or less. In one or more specific embodiments, the one or more tubular members 403 can be made from one or more materials suitable for use in cryogenic or near-cryogenic service, such as temperatures of less than about −100° C. and pressures greater than about 10 MPa.

Still referring to FIG. 4, the support system 400 can further include a frame structure or frame 110 disposed about the support assemblies 405, 410 having the tubular members 403 supported therethrough. The frame structure 110 can include a first ("left") side 430, a second ("right") side 435, and a third ("top") side 440. Although not shown, the frame structure 110 can further include a fourth ("bottom") side. As illustrated, the first side 430 and the second side 435 of the frame 110 can be parallel or substantially parallel with one another. In at least one other specific embodiment, the first side 430 and the second side 435 can be non-parallel with respect to one another. Although not shown, one or more support beams or braces can be used between the sides of the frame structure 110 to provide additional support and stability.

The frame structure 110 can have any number of posts, walls, or supports. In an embodiment, the frame structure 110 can resemble a box-shaped structure or open sided container having any number of walls or sides, including the left side 430, the right side 435, and the top. Each side 430, 435, 440 of the frame structure 110 can be a solid construction such as a solid wall. Each side 430, 435, 440 of the frame structure 110 can also be a solid construction with holes or openings disposed therethrough. Further, each side 430, 435, 440, can be or include one or more cross-beams, braces, poles, or other known construction support member. As used herein, the terms "left" and "right," "top" and "bottom," "front" and "rear," and other like directional terms are merely used for convenience to indicate spatial orientations or spatial relationships relative to one another in respect to the support system 100.

In one or more embodiments, the frame structure 110 can be disposed on the deck of a ship, the floor of a cargo hold of a ship, a truck bed, a train car bed, or other mode of transportation. For example, the frame structure 110 can be disposed on a vehicle, a platform, or the like to provide a mobile support system or the frame structure 110 can be secured to the ground to provide a stationary or fixed support system. Any side or portion of the vehicle can be used to form part of the frame structure 110. For example, the inner or interior walls of a cargo hold within a transport ship can serve as any one or more sides 430, 435, 440 of the frame structure 110.

The frame structure 110 can be made of any suitable material. Suitable materials include, but are not limited to, a metal, metal alloy, non-metallic materials, or combinations thereof. Illustrative metals and metal alloys can include, but are not limited to, steel, carbon steel, steel alloys, stainless steel, stainless steel alloys, aluminum, aluminum alloys, nickel, nickel based alloys, bronze, brass, non-ferrous metals, non-ferrous metal alloys, or combinations thereof. Illustrative non-metallic materials can include, but are not limited to, carbon fiber, epoxies, fiberglass, polypropylene, polyethylene, ethylene propylene diene monomer ("EPDM"), polyurethane, blends thereof, or other polymeric materials with suitable mechanical properties.

Embodiments of the present invention further relate to any one or more of the following paragraphs:

1. A support structure for supporting tubular members, comprising at least one body having a plurality of openings disposed therethrough, wherein each opening has an inner surface comprising at least one circular portion and at least one elliptical portion.

2. The support structure according to paragraph 1, further comprising an insert at least partially disposed within at least one opening.

3. The support structure according to paragraph 1 or 2, wherein the body is made of corrugated sheet metal.

4. The support structure according to any one of paragraphs 1 to 3, wherein the body is made of two individual sections arranged side by side or one on top of another.

5. The support structure according to any one of paragraphs 1 to 4, further comprising a frame disposed about the body, wherein the frame is connected to and supports the body.

6. The support structure according to any one of paragraphs 1 to 5, wherein the at least one circular portion opposes the at least one elliptical portion.

7. The support structure according to any one of paragraphs 1 to 6, wherein the body has a constant thickness from a first end to a second end.

8. The support structure according to any one of paragraphs 1 to 7, wherein a thickness of the body varies from a first end to the second end, and wherein the second end is thicker than the first end.

9. A system for supporting tubular members comprising two or more support structures, wherein each support structure comprises: at least one body having a plurality of openings disposed therethrough, wherein each opening has an inner surface comprising at least one circular portion and at least one elliptical portion.

10. The system according to paragraph 9, wherein the two or more support structures are disposed adjacent one another.

11. The system according to paragraph 9 or 10, wherein the two or more support structures at least partially overlap one another.

12. The system according to any one of paragraphs 9 to 11, wherein the two or more support structures are stacked one on top of the other.

13. The system according to any one of paragraphs 9 to 12, wherein the two or more support structures are arranged end to end.

14. The system according to any one of paragraphs 9 to 13, wherein each support structure has a different height or width dimension.

15. The system according to any one of paragraphs 9 to 14, wherein a frame is disposed about the two or more support structures.

16. The system according to any one of paragraphs 9 to 15, wherein each support structure further comprises an insert at least partially disposed within at least one opening.

17. The system according to any one of paragraphs 9 to 16, wherein the body of each support structure is made of corrugated sheet metal.

18. The system according to any one of paragraphs 9 to 17, wherein the body of each support structure is made of two individual sections arranged side by side or one on top of another.

19. The system according to any one of paragraphs 9 to 18, wherein the at least one circular portion of each opening opposes the at least one elliptical portion of each opening.

20. The system according to any one of paragraphs 9 to 19, wherein the body of each support structure has a constant thickness from a first end to a second end or a varying thickness from the first end to the second end such that the second end is thicker than the first end.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A support structure for supporting tubular members, comprising:
    a body having a plurality of openings disposed therethrough, each opening having an inner surface that has at least two different curvatures that are diametrically opposed to one another, one curvature that is circular and one curvature that is non-circular thereby forming an air gap outside at least a portion of a cylindrical tubular member when supporting the cylindrical tubular member, wherein the non-circular curvature is an arc that follows an elliptical curve having a major radius and a minor radius that are not equal to one another, and the air gap is located adjacent the elliptical curve.

2. The support structure of claim 1, further comprising an insert at least partially disposed within at least one opening to provide a barrier between the body and the cylindrical tubular member when supporting the cylindrical tubular member.

3. The support structure of claim 1, wherein the body is made of corrugated sheet metal.

4. The support structure of claim 1, wherein the body is made of one or more non-metallic materials.

5. The support structure of claim 4, wherein the one or more non-metallic materials is selected from the group consisting of carbon fiber, epoxies, concrete, fiberglass, rubber, thermoplastics, and elastomers.

6. The support structure of claim 1, wherein the body is made of at least two sections arranged side by side or one on top of another.

7. The support structure of claim 1, wherein a frame is disposed about the body, and the frame is connected to and supports the body.

8. The support structure of claim 1, wherein the body has a thickness that varies from a first end to a second end, and wherein the second end is thicker than the first end.

9. A system for supporting tubular members comprising two or more support structures, wherein each support structure comprises:
    a body having a plurality of openings disposed therethrough, each opening having an inner surface that has at least two different curvatures that are diametrically opposed to one another, one curvature that is circular and one curvature that is non-circular thereby forming an air gap outside at least a portion of a cylindrical tubular member when supporting the cylindrical tubular member, wherein the non-circular curvature is an arc that follows an elliptical curve having a major radius and a minor radius that are not equal to one another, and the air gap is located adjacent the elliptical curve.

10. The system of claim 9, wherein the two or more support structures are disposed adjacent one another.

11. The system of claim 9, wherein a frame is disposed about the two or more support structures, and the frame is connected to and supports the two or more support structures.

12. The system of claim 9, wherein each support structure further comprises an insert at least partially disposed within at least one opening to provide a barrier between the body and the cylindrical tubular member when supporting the cylindrical tubular member.

13. The system of claim 9, wherein the body of each support structure is made of corrugated sheet metal.

14. A support structure for supporting tubular members, comprising:
    a metal body having a plurality of openings disposed therethrough, each opening having an inner surface that has at least two different curvatures that are diametrically opposed to one another, one curvature that is circular and one curvature that is non-circular thereby forming an air gap outside at least a portion of a cylindrical tubular member when supporting the cylindrical tubular member, wherein the non-circular curvature is an arc that follows an elliptical curve having a major radius and a minor radius that are not equal to one another, and the air gap is located adjacent the elliptical curve;
    an insert at least partially disposed within at least one opening to provide a barrier between the metal body and the cylindrical tubular member when supporting the cylindrical tubular member; and a frame disposed about the metal body, wherein the frame is connected to and supports the metal body.

15. The support structure of claim 14, wherein the metal body is made of at least two sections arranged side by side or one on top of another.

16. The support structure of claim 14, wherein the metal body is corrugated sheet metal.

17. The support structure of claim 14, wherein the metal body has a thickness that varies from a first end to a second end, and wherein the second end is thicker than the first end.

18. The support structure of claim 1, wherein the at least two different curvatures that are diametrically opposed to one another are coplanar and located on opposite sides of the body.

19. The system of claim 9, wherein the at least two different curvatures that are diametrically opposed to one another are coplanar and located on opposite sides of the body.

20. The support structure of claim 14, wherein the at least two different curvatures that are diametrically opposed to one another are coplanar and located on opposite sides of the body.

* * * * *